United States Patent
Matsudaira et al.

(10) Patent No.: US 7,559,872 B2
(45) Date of Patent: Jul. 14, 2009

(54) CONTINUOUSLY VARIABLE TRANSMISSION CONTROLLER

(75) Inventors: Naotada Matsudaira, Saitama (JP); Michio Asumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 363 days.

(21) Appl. No.: 11/476,648

(22) Filed: Jun. 29, 2006

(65) Prior Publication Data

US 2007/0004552 A1   Jan. 4, 2007

(30) Foreign Application Priority Data

Jun. 30, 2005   (JP)   ............................. 2005-191626

(51) Int. Cl.
*F16H 61/662* (2006.01)
(52) U.S. Cl. .......................................... 477/46; 701/56
(58) Field of Classification Search .................. 477/46; 701/56
See application file for complete search history.

(56) References Cited

U.S. PATENT DOCUMENTS 5,025,686 A * 6/1991 Sato et al. ...................... 477/44
5,947,861 A * 9/1999 Nobumoto .................... 477/37
6,821,228 B2 * 11/2004 Aoki et al. .................... 477/44

FOREIGN PATENT DOCUMENTS

| CN | 1392356 A | 1/2003 |
|---|---|---|
| CN | 1470783 A | 1/2004 |
| EP | 1 271 004 A2 | 1/2003 |
| JP | 6-123351 A | 5/1994 |
| JP | 9-196156 A | 7/1997 |
| JP | 9-196158 A | 7/1997 |
| TW | 552215 B | 9/2003 |
| TW | 200402516 A | 2/2004 |
| TW | 593007 B | 6/2004 |

* cited by examiner

*Primary Examiner*—David D Le
*Assistant Examiner*—Derek D Knight
(74) *Attorney, Agent, or Firm*—Birch, Stewart, Kolasch & Birch, LLP (57) ABSTRACT

A continuously variable transmission is mounted on a vehicle capable of selecting plural drive modes and changes a target engine speed between drive modes. A pulley ratio is controlled by a motor. An ECU for transmission control includes a calculation section which outputs a target engine speed as a function of throttle opening and vehicle speed, and a motor control value determination section which outputs a control value for controlling the motor based on the target engine speed and an actual engine speed. In a case where, when a drive mode is selected, the current target engine speed changes by an amount exceeding a predetermined judgment value according to vehicle speed, the motor control value determination section updates the current target engine speed in a stepwise manner. The resulting configuration reduces a shift shock caused by a drive mode change.

38 Claims, 7 Drawing Sheets

CONTINUOUSLY VARIABLE TRANSMISSION CONTROLLER

CROSS-REFERENCE TO RELATED APPLICATION

The present application claims priority under 35 U.S.C. §119 to Japanese Patent Application No. 2005-191626, filed Jun. 30, 2006, the entire contents of which are hereby incorporated by reference.

BACKGROUND OF THE INVENTION

1. Field of the Invention

The present invention relates to a continuously variable transmission controller, and more particularly, to a continuously variable transmission controller suitable for reducing a shift shock generated when a drive mode is changed causing a shift characteristic to largely change.

2. Description of Background Art

A controller (See, for example, JP-A No. 123351/1994) for a belt-type continuously variable transmission connected to an internal-combustion engine (hereinafter referred to as an "engine") has been known in which a pulley ratio is controlled by, using a motor, sliding a movable side of a drive pulley along an output shaft of the engine. In the controller, a target ratio is determined by searching a map based on a throttle opening and a vehicle speed, and the motor is driven such as to realize the target ratio. Furthermore, when the difference between the target ratio and the actual pulley ratio is larger, the duty ratio of the motor is made larger. At the same time, the duty is controlled according to whether an accelerator is on or off. The transmission controlled in the above manner is expected to operate smoothly meeting driving-condition-dependent requests for gear shifting.

For a vehicle carrying a continuously variable transmission, use of a control method in which plural drive modes are set for the vehicle and the shift characteristic is changed between drive modes has been under study. In such a vehicle, changing the shift characteristic at a time of a drive mode change causes, in a case where there is a large difference between a target engine speed and the actual engine speed, the transmission gear ratio to be changed sharply to cope with the large difference between the target and actual engine speeds. Such an arrangement causes a shift shock which may impair the riding comfort of the vehicle and affect the durability of the transmission.

Controlling the duty of a motor based on the difference between a target value and an actual value as in the controller described in JP-A No. 123351/1994 may be considered to solve the above problem. A shift shock caused by a change in shift characteristic resulting from a drive mode change, however, cannot be adequately reduced just by adjusting the duty of the motor according to a difference between pulley ratios. Hence, a further study has been considered necessary.

SUMMARY AND OBJECTS OF THE INVENTION

An object of the present invention is to provide a continuously variable transmission controller which can reduce a shift shock generated when a shift characteristic is changed in a continuously variable transmission capable of changing the shift characteristic between drive modes of a vehicle.

According to a first aspect of the present invention having the above object, a controller for a continuously variable transmission capable of selecting plural drive modes includes an actuator for changing a transmission gear ratio of the continuously variable transmission. The controller also includes target value output means which outputs a target engine speed as a function of throttle opening and vehicle speed, and shift characteristic determination means which determines a driving direction and a driving speed of the actuator based on a difference between the target engine speed and the actual engine speed. Furthermore, the shift characteristic determination means includes shift characteristic changing means that updates stepwise a current target engine speed to change to a value for use after a drive mode change, in case where it is judged that the current target engine speed is changed exceeding a predetermined judgment value according to vehicle speed when a drive mode is selected.

According to a second aspect of the present invention, the controller includes means for deciding a throttle opening judgment value set as a function of drive mode and vehicle speed. Furthermore, the shift characteristic changing means is configured such that, when a current throttle opening is larger than the throttle opening judgment value, the target engine speed is updated according to a drive mode, and when a current throttle opening is smaller than the throttle opening judgment value, the target engine speed is updated according to the drive mode and the vehicle speed.

According to a third aspect of the present invention, an updating speed of the target engine speed differs depending on whether the drive mode change causes the target engine speed to increase or decrease.

Furthermore, according to a fourth aspect of the present invention, the updating speed of the target engine speed is made lower when the engine speed is higher at a time of the drive mode change.

According to the first aspect of the present, a target engine speed can be changed in a stepwise manner. Therefore, when a change of shift characteristic which causes the engine speed to change by a large amount is requested following a drive mode change and the variation required of the engine speed is larger than a judgment value that takes into account the vehicle speed at that time, the target engine speed can be changed gradually. As the target engine speed is changed gradually, an actuator operates in small steps. In this way, a shift shock can be reduced to prevent a vehicle driver from feeling discomfort and to enhance the durability of the transmission.

According to the second aspect of the present invention, when the current throttle opening is larger than a judgment value corresponding to the current drive mode and vehicle speed, that is, when it is determined that the vehicle is accelerating, the shift characteristic is changed by a variation set according to the drive mode regardless of the vehicle speed. On the other hand, when the current throttle opening is smaller than the judgment value, that is, when it is determined that the vehicle is decelerating, the shift characteristic is changed by a variation set according to both of the drive mode and the vehicle speed. This is because, during deceleration, the shift shock easily changes depending on the vehicle speed. In this way, it is possible to change the shift characteristic in small steps corresponding to the vehicle speed.

According to the third aspect of the present invention, the speed of changing an engine speed can be made different depending on whether the engine speed is increasing, or whether the engine speed is decreasing. This is convenient as a shift shock caused by a change of an engine speed differs depending on whether the engine speed is increasing or decreasing.

According to the fourth aspect of the present invention, when the current engine speed is higher, a longer time can be taken for transition to a target engine speed so as to reduce the shift shock caused by the change of the engine speed. This is convenient as a larger shift shock results when the current engine speed is higher.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
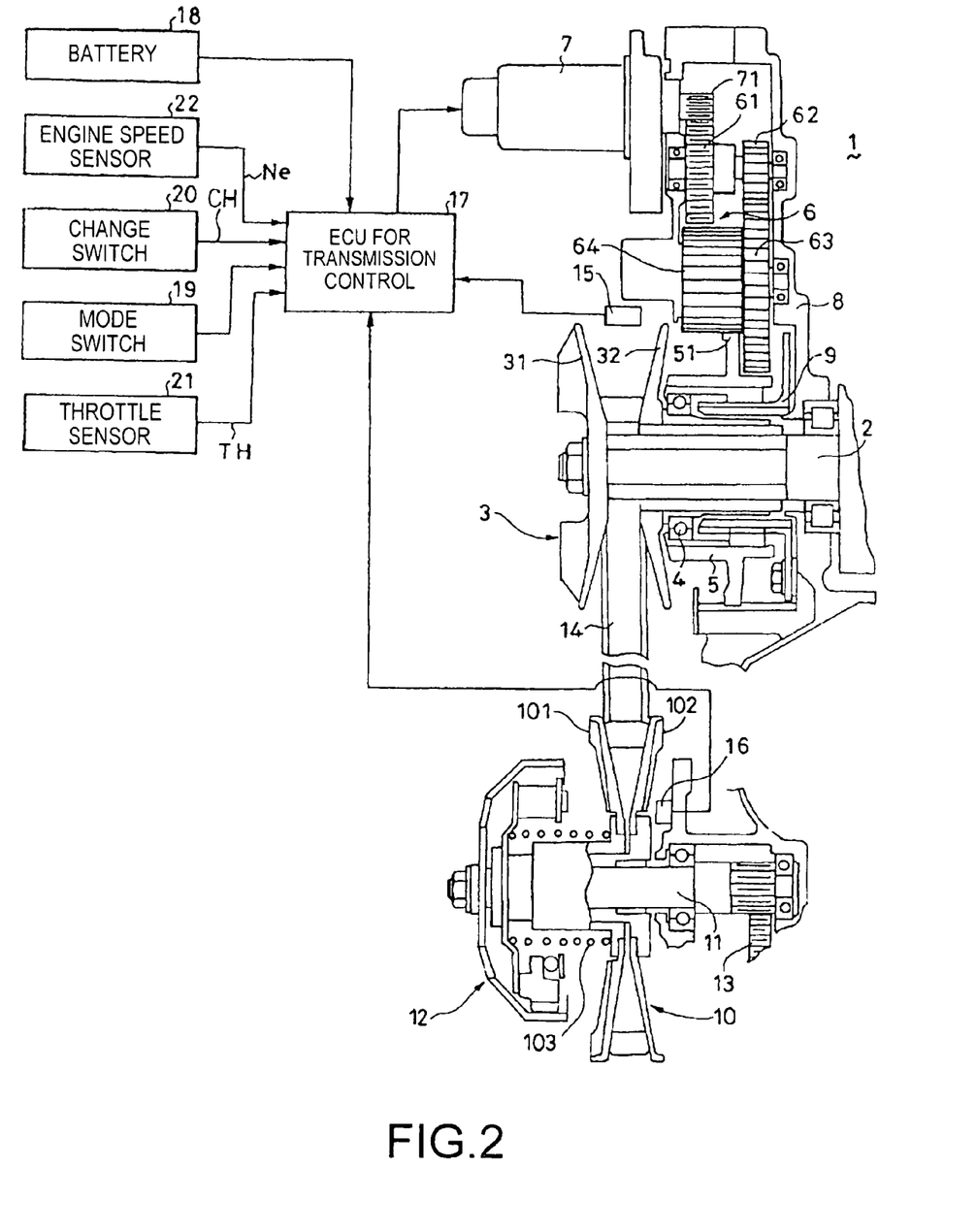
FIG. 2 is a diagram showing a system configuration of a continuously variable transmission controller according to an embodiment of the present invention.

An embodiment of the present invention will be described in the following with reference to the accompanying drawings. FIG. 2 is a diagram showing a system configuration of a continuously variable transmission controller according to an embodiment of the present invention. A continuously variable transmission 1 is connected to a crankshaft, that is, an output shaft 2, of an engine (not shown) used as a drive source, for example, for an all terrain vehicle (ATV). A drive pulley 3 includes a fixed pulley piece 31 and a movable pulley piece 32 which is mounted on the output shaft 2 to be slidable along the axial direction of the output shaft 2. A slider 5 is supported on a periphery of a hub of the movable pulley piece 32 via a bearing 4. A gear 51 is formed on a periphery of the slider 5. The gear 51 engages with a final stage gear 64 of a speed reducer 6 comprising four gears 61 to 64. The first stage gear 61 of the speed reducer 6 engages with an output gear 71 of a motor 7. A female screw formed on an inner periphery of the slider 5 is engaged with a male screw formed on an outer periphery of a cylindrical part 9 fixed to a case 8.

When the motor 7 rotates and causes the slider 5 to rotate, the female screw formed on the slider 5 rotates about the male screw formed on the cylindrical part 9, and the slider 5 moves along the output shaft 2 due to a feeding function of the screws. As the slider 5 moves, the distance between the fixed pulley piece 31 and the movable pulley piece 32 making up the drive pulley 3 changes.

A passive pulley 10 of the continuously variable transmission 1 is supported by a passive shaft 11. The passive pulley 10 includes a movable pulley piece 101 and a fixed pulley piece 102, both of which are rotatable about the passive shaft 11. The movable pulley piece 101 is slidable along the passive shaft 11. It is pushed toward the fixed pulley piece 102 by a coil spring 103. The passive shaft 11 is provided with a centrifugal clutch 12. The movable pulley piece 101 is connected to the passive shaft 11 via the clutch 12. The passive shaft 11 is connected to a drive shaft of an ATV via a speed reducer which includes a gear 13. A V-belt 14 is wound around the drive pulley 3 and the passive pulley 10.

A position sensor 15 which detects a reset position of the movable pulley piece 32 of the drive pulley 3 is provided in proximity to a periphery of the movable pulley piece 32. A passive pulley rotation speed sensor 16 which detects a rotation speed of the passive pulley 11 is disposed to oppose a magnetic material (not shown) which rotates together with the passive pulley 10.

An ECU 17 for transmission control which drives the motor 7 is provided as a controller for the continuously variable transmission 1. The ECU 17 for transmission control has a microcomputer and is powered by a battery 18.

The vehicle is provided with a mode switch 19 for selecting a drive mode. When a drive mode is selected out of a manual mode and plural automatic modes, a corresponding shift characteristic is selected. A change switch 20 outputs a change signal CH for switching the direction of changing a shift position between upward and downward. The change switch 20 becomes effective when the manual mode is selected, and causes a shift position to be selected according to the change signal CH. In the manual mode, the motor 7 is driven such that a predetermined pulley ratio is set for each shift position. The pulley ratio is a ratio of a rotation speed N0 of the drive pulley 3 to a rotation speed N1 of the passive pulley 10, that is, (N1/N0). A throttle sensor 21 detects an opening of a throttle valve of the engine (not shown) and outputs opening information TH. An engine speed sensor 22 detects a reluctor provided on a rotor of a generator (ACG) (not shown) connected to the output shaft of the engine and outputs a rotation speed of the ACG, that is, a rotation speed Ne of the engine.

Next, drive modes will be described. Plural drive modes have been set, and each of the plural drive modes has a corresponding shift characteristic. The present embodiment uses one manual mode and two automatic modes, that is, a sport drive mode and a fuel-efficient drive mode.

Plural transmission gear ratios have been set for use in the manual mode. Of the plural transmission gear ratios, one specified by the change switch 20 is selected. The vehicle can then be driven using the selected transmission gear ratio as a fixed transmission gear ratio.

Figure 10:
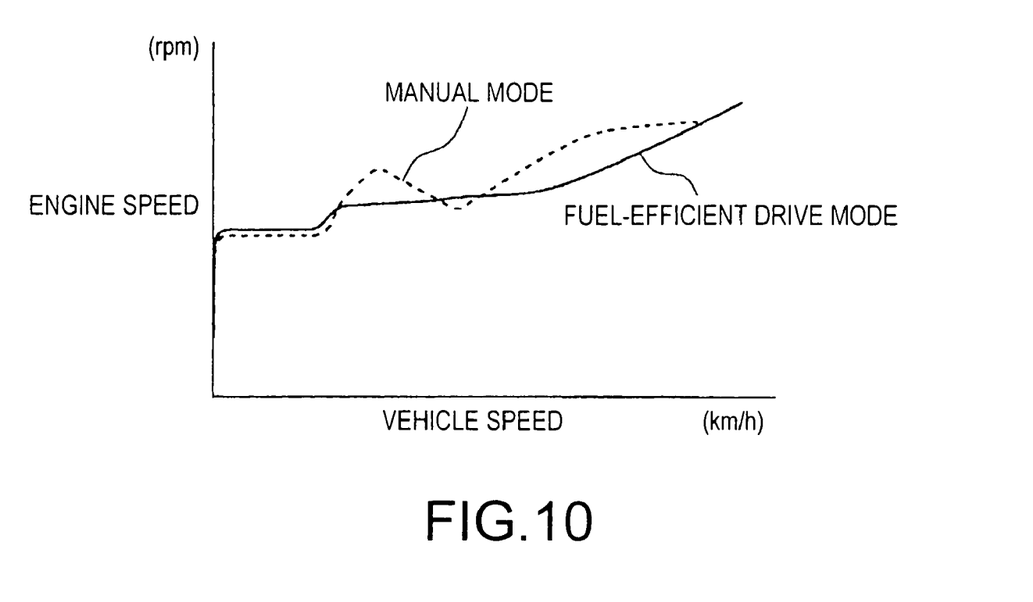
FIG. 10 is a diagram showing an example of a shift characteristic in a fuel-efficient drive mode.
Figure 11:
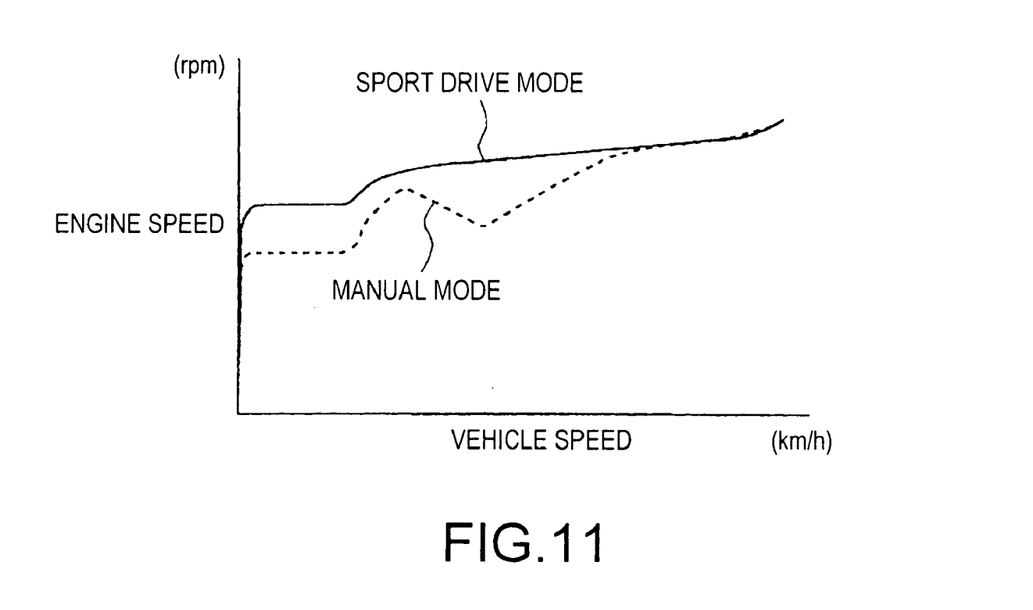
FIG. 11 is a diagram showing an example of a shift characteristic in a sport drive mode.

In the sport drive mode, more powerful driving is possible at a higher engine speed than in the manual mode. In the fuel-efficient drive mode, contrary to the sport drive mode, driving at an engine speed lower than in the manual mode is realized. FIGS. 10 and 11 show examples of shift characteristics corresponding to the fuel-efficient drive mode and the sport drive mode, respectively.

Figure 1:
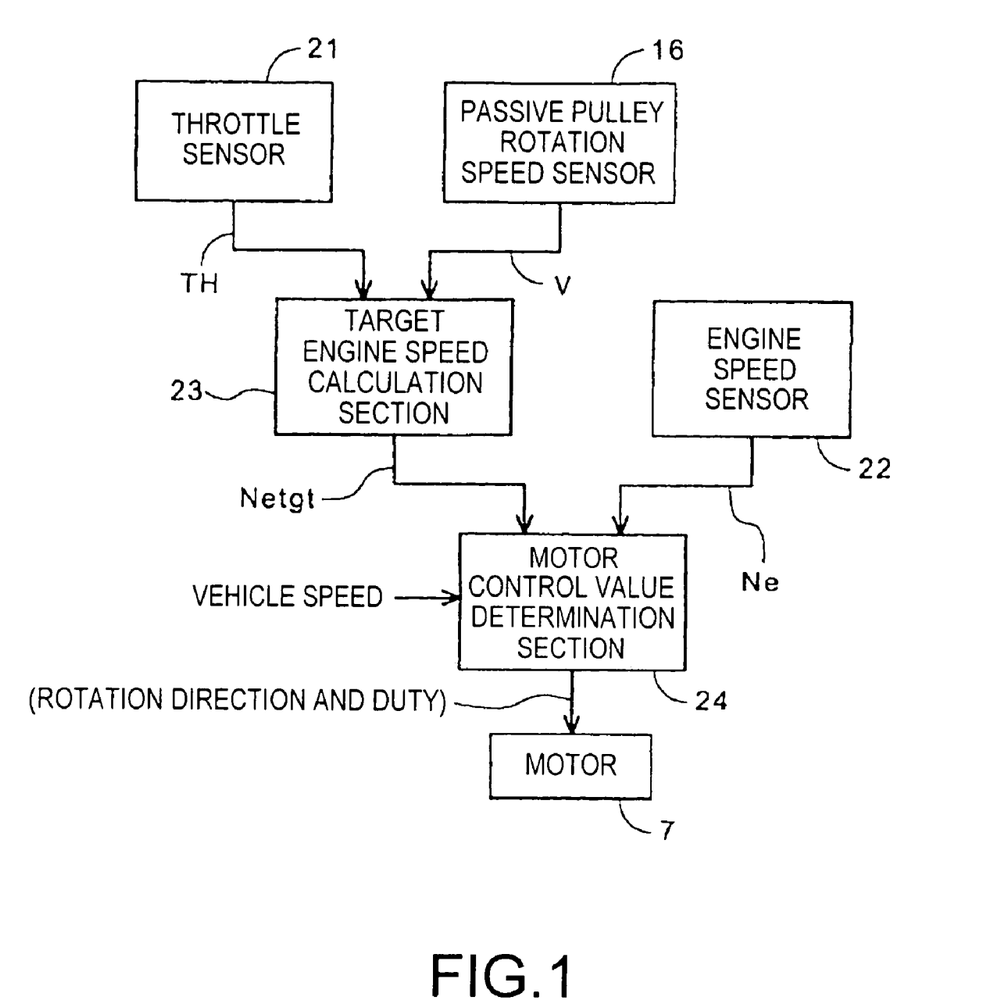
FIG. 1 is a block diagram showing functions of essential parts of a continuously variable transmission controller according to an embodiment of the present invention.

FIG. 1 is a block diagram showing functions of essential parts of the transmission controller (ECU 17). A target engine speed calculation section 23 calculates a target engine speed Netgt based on the throttle opening TH and a vehicle speed V. The target engine speed calculation section 23 can be made up of, for example, a map which can output a target engine speed Netgt as a function of the throttle opening TH and the vehicle speed V. Such a map is prepared for each drive mode. The rotation speed of the passive pulley 10 that is detected by the passive pulley rotation speed sensor 16 may be substituted for the vehicle speed V.

A motor control value determination section 24 constitutes means of determining a shift characteristic. It determines the direction of rotation of the motor 7 and the duty of the motor 7, that is, the rotation speed of the motor 7 based on a difference between the target engine speed Netgt calculated by the target engine rotation calculation section 23 and an actual engine speed Ne obtained by the engine speed sensor 22.

When the target engine speed Netgt is higher than the actual engine speed Ne, the motor 7 is driven in the direction for widening the distance between the fixed pulley 31 and the movable pulley 32 to increase the pulley ratio. When the difference between the target engine speed Netgt and the actual engine speed Ne is larger than the judgment value corresponding to the vehicle speed, the target engine speed Netgt is changed gradually so as to extend the time used to change the pulley ratio. This will be described in more detail later. The motor 7 is driven in accordance with control values outputted from the motor control value determination section 24, that is, in the direction of rotation and at the duty of the motor 7 specified by the control values so as to meet the target engine speed Netgt. Consequently, the pulley ratio is changed.

In a conventional apparatus, when the drive mode is changed, the target engine speed Netgt changes sharply generating a large shift shock. In the present embodiment on the other hand, when the drive mode is changed, the target engine speed Netgt is changed gradually, so that the shift shock is reduced.

Figure 3:
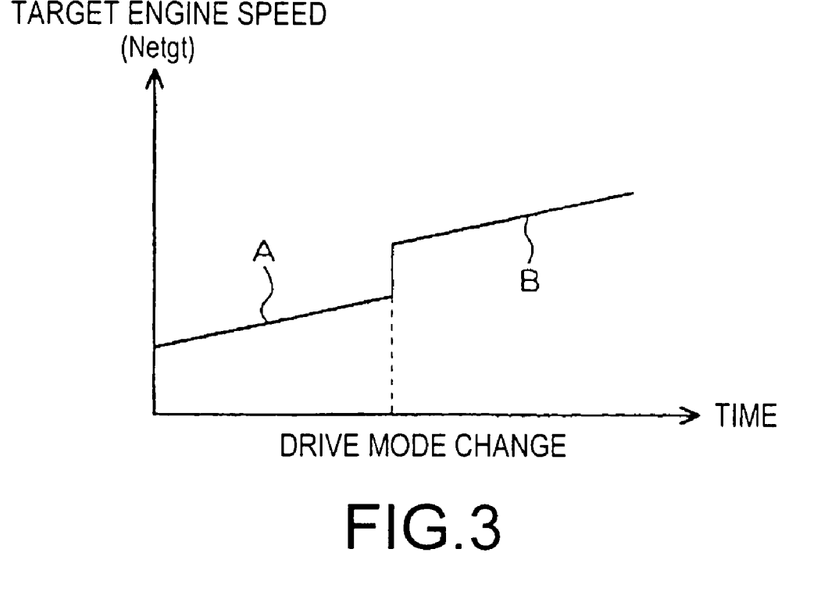
FIG. 3 is a diagram showing how a target engine speed Netgt changes.

FIG. 3 is a diagram showing how the target engine speed Netgt changes when no measure to make the target engine speed Netgt change gradually is taken. Lines A and B represent characteristics of the target engine speed Netgt before and after a drive mode change, respectively.

Figure 4:
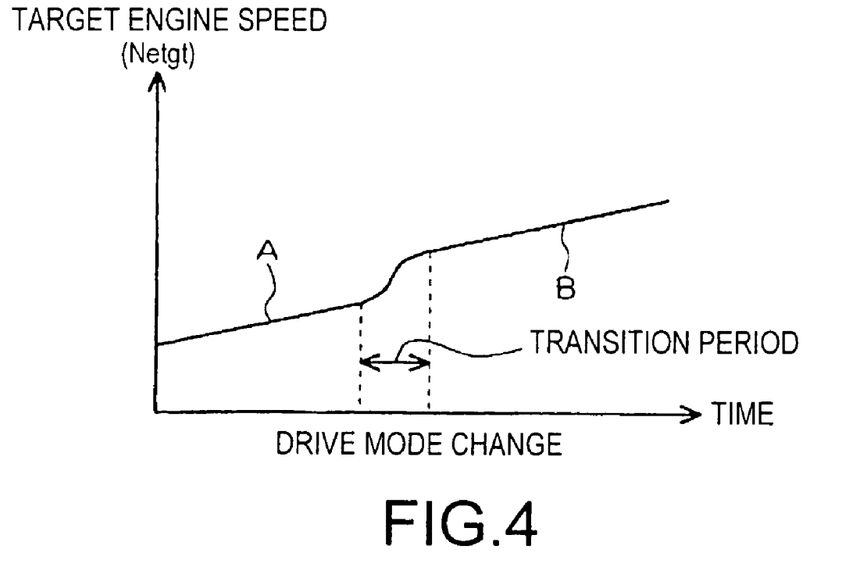
FIG. 4 is a diagram showing how a target engine speed Netgt changes.

FIG. 4 is a diagram showing an example effect of a measure taken to reduce the shift shock. As shown, when the drive mode is changed, the target engine speed Netgt is not changed instantly to the line B. It is updated gradually from the line A to the line B over a transition period. In this way, the shift shock can be reduced. The transition period is varied according to the target drive mode, the current drive mode, and the vehicle speed at the time when the current drive mode is changed (see FIG. 7).

Figure 5:
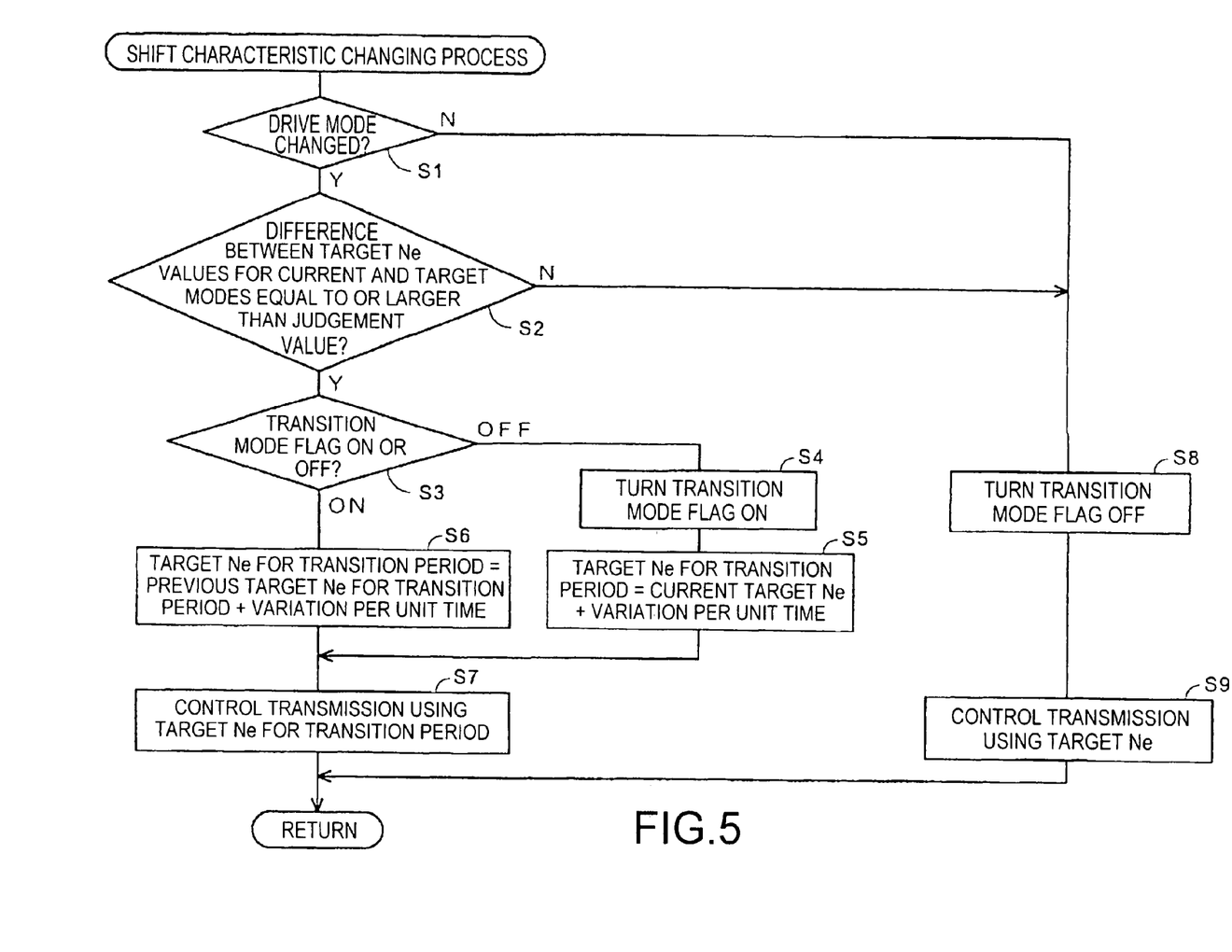
FIG. 5 is a flowchart of a process for changing a characteristic of a continuously variable transmission.
Figure 6:
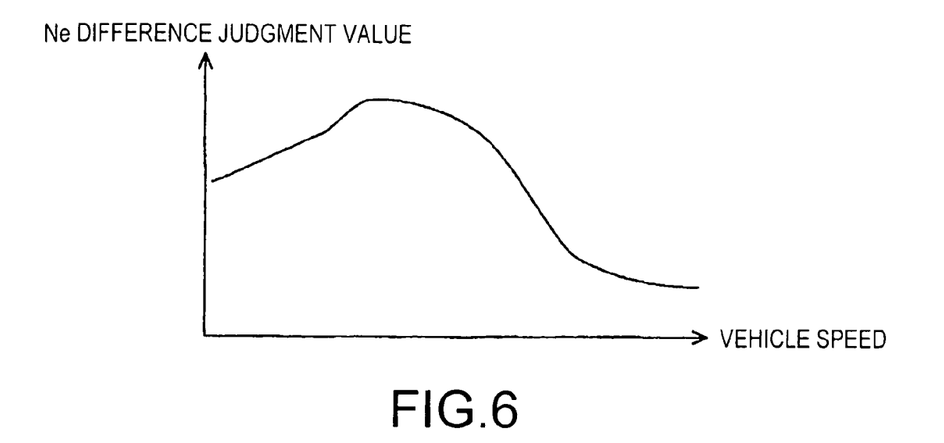
FIG. 6 is a diagram showing an example of a map of judgment values for judging a difference between target engine speeds.

FIG. 5 is a flowchart of a characteristic changing process for gradually changing the target engine speed Netgt. In step S1, whether or not the mode switch 19 has been operated, that is, whether or not the drive mode has been changed is determined. When the drive mode is determined to have been changed, the process advances to step S2. In step S2, whether or not the difference between the target engine speed in the drive mode to be changed (current drive mode) and the target engine speed in the drive mode to be changed to (target drive mode) exceeds a threshold value (judgment value) is determined. At this time, the judgment value is read out from a prepared map which corresponds to the vehicle speed V. FIG. 6 shows an example of a map showing a relationship between vehicle speed and judgment value.

When the difference between the two target engine speeds is determined to be larger than the judgment value, the process advances to step S3, in which it is determined whether a transition mode flag is on or off. As the transition mode flag is initially off, it is determined to be off when checked for the first time, so that the process advances to step S4 in which the transition mode flag is turned on. In step S5, the current target engine speed added to by a variation per unit time is set as a target engine speed Netgt for the transition period.

When the transition mode flag is determined to be on in step S3, the process advances to step S6 in which the previous target engine speed Netgt added to by a variation per unit time is set as a target engine speed Netgt for the transition period. In step S7, transmission control is performed based on the target engine speed Netgt calculated in step S6 or S7 and using functions described with reference to FIG. 2.

When the outcome of step S1 or S2 is negative, the process advances to step S8 in which the transition mode flag is turned off. In step S9, transmission control is performed using the normal target engine speed Netgt (for example, as represented by the foregoing line B), not the target engine speed for the transition period.

Even though, in steps S5 and S6 described above, the current or previous target engine speed Netgt was added to by a variation per unit time, the current or previous target engine speed Netgt is subtracted by the variation per unit time in cases where the target engine speed Netgt for after the drive mode change is lower than the current or previous target engine speed Netgt.

Figure 7:
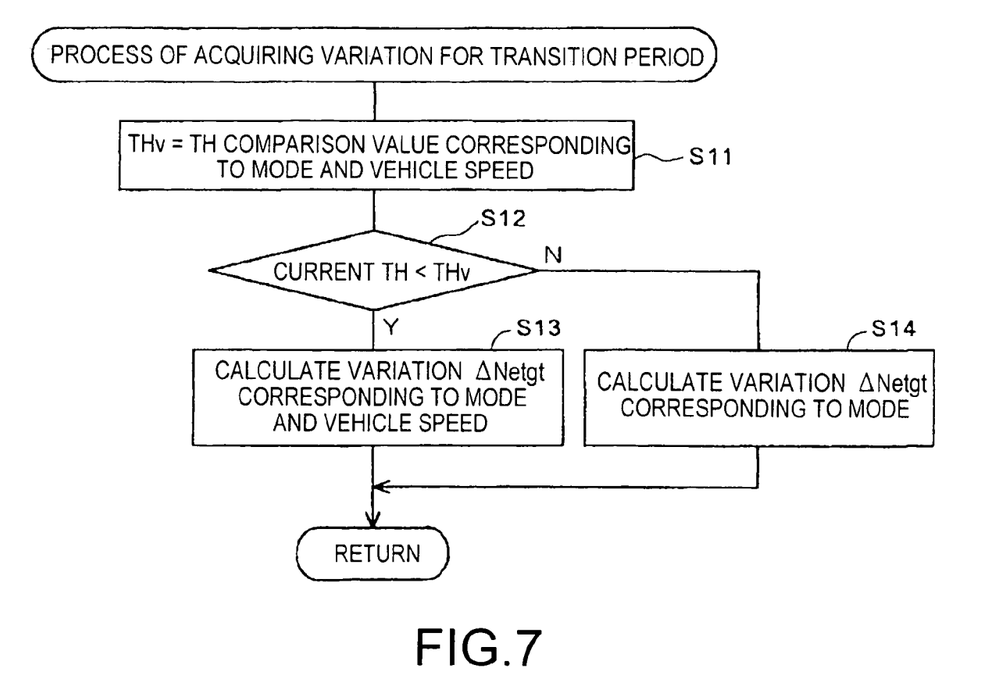
FIG. 7 is a flowchart showing an example of calculation of a variation per unit time of a target engine speed Netgt.

FIG. 7 is a flowchart showing an example of a calculation of a variation per unit time of the target engine speed Netgt. The variation determines a transition period. In the calculation example, the variation of the target engine speed Netgt is determined by the drive mode and vehicle speed V, or by the drive mode only, depending on the magnitude of the throttle opening TH.

In step S11 shown in FIG. 7, a comparison value THv to be compared with the throttle opening TH is calculated. The comparison value THv is calculated based on the drive mode and the vehicle speed V. It is possible, for example, to prepare a map showing a relationship between the throttle comparison value THv and the vehicle speed V for each drive mode and determine, when required, a value of the comparison value THv by referring to the corresponding map.

In step S12, the current throttle opening TH is compared with the comparison value THv. When the throttle opening TH is smaller than the comparison value THv, the process advances to step S13. In step S13, the target engine speed variation per unit time ΔNetgt corresponding to the drive mode and vehicle speed V is calculated. It is possible, for example, to prepare a map showing a relationship between the target engine speed variation per unit time ΔNetgt and the vehicle speed V for each drive mode and determine, when required, a value of the target engine speed variation per unit time ΔNetgt by referring to the corresponding map.

When the outcome of step S12 is negative, that is, when the throttle opening TH is larger than the comparison value THv, the process advances to step S14. In step S14, the target engine speed variation per unit time ΔNetgt preset for the drive mode is read out.

Figure 8:
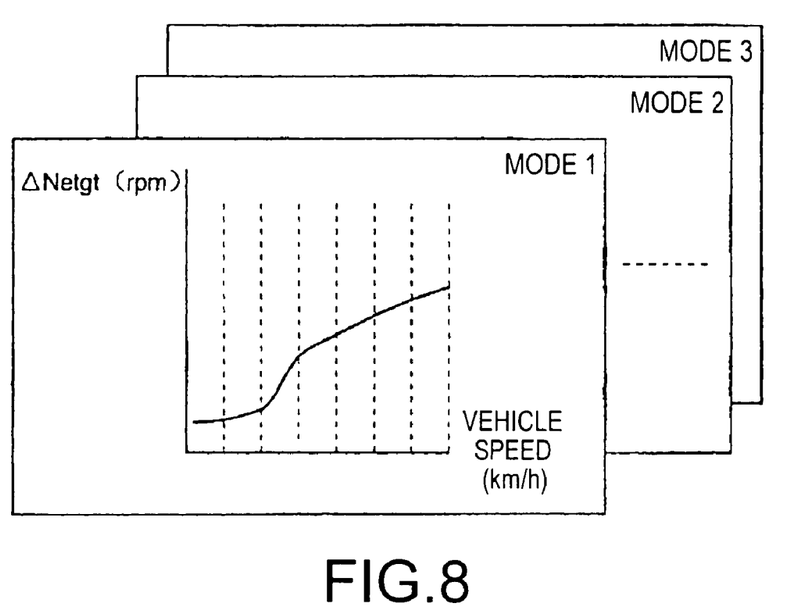
FIG. 8 is a diagram showing an example of a map of target engine speed variations per unit time ΔNetgt dependent on vehicle speed.

FIG. 8 is a diagram showing an example of a map showing the target engine speed variation per unit time ΔNetgt dependent on the vehicle speed. Different maps like this are prepared for different drive modes. It is preferable that different maps corresponding to each drive mode be prepared for use in addition and for use in subtraction, respectively. When different maps are used for addition and for subtraction, the transition period becomes different between when addition is made and when subtraction is made. For example, the target engine speed variation per unit time ΔNetgt corresponding to a vehicle speed is made smaller for use in addition than for use in subtraction.

Figure 9:
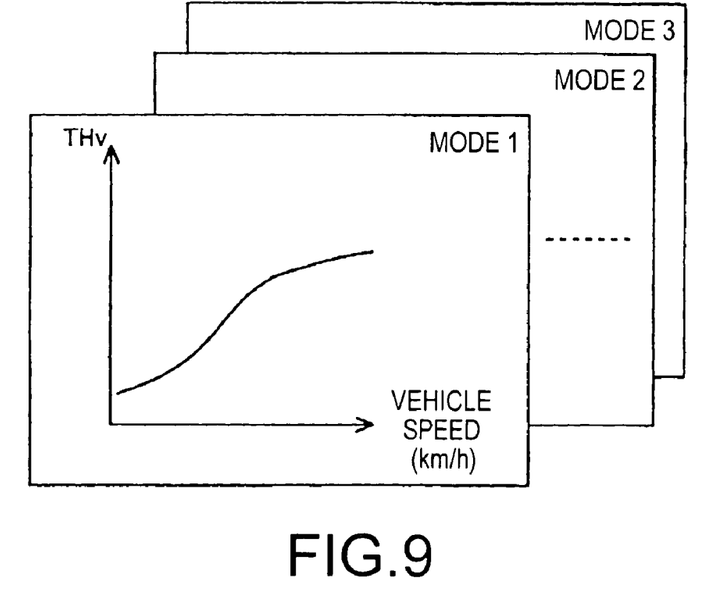
FIG. 9 is a diagram showing an example of a map of throttle opening comparison values THv dependent on vehicle speed.

FIG. 9 is a diagram showing an example of a map which can be used in step S11 and which shows the throttle opening comparison value THv dependent on the vehicle speed. Different maps like this are prepared for different drive modes.

Also, when the engine speed Ne is higher at the time of a drive mode change, the transition period may be made longer, that is, the target engine speed variation per unit time ΔNetgt may be made smaller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller for a continuously variable transmission capable of selecting plural drive modes, comprising:
    means for detecting a throttle opening;
    means for detecting a vehicle speed;
    means for detecting an engine speed;
    an actuator adapted to change a transmission gear ratio of the continuously variable transmission;
    target value output means adapted to output a target engine speed as a function of the throttle opening and the vehicle speed, the target value output means includes map means corresponding to each of the drive modes for calculating the target engine speed; and
    shift characteristic determination means adapted to determine a driving direction and a driving speed of the actuator based on a difference between the target engine speed and an actual engine speed,
    wherein the shift characteristic determination means includes shift characteristic changing means,
    the shift characteristic changing means being adapted to change the target engine speed on a stepwise basis from a former target engine speed calculated by former map means to a current target engine speed calculated by current map means, when the map means is changed in accordance with changing the drive mode and a difference between the former target engine speed and the current target engine speed exceeds a predetermined judgment amount.

2. The continuously variable transmission controller according to claim 1, comprising:
    means for deciding a throttle opening judgment value set as a function of the drive mode and the vehicle speed;
    wherein the shift characteristic changing means is configured such that,
    when a current throttle opening is larger than the throttle opening judgment value, the target engine speed is updated according to the drive mode, and
    when a current throttle opening is smaller than the throttle opening judgment value, the target engine speed is updated according to the drive mode and the vehicle speed.

3. The continuously variable transmission controller according to claim 1, wherein:
    an updating speed of the target engine speed differs depending on whether the drive mode change causes the target engine speed to increase or decrease.

4. The continuously variable transmission controller according to claim 1, wherein:
    an updating speed of the target engine speed is made lower when the engine speed is higher according to engine speed when the drive mode is changed.

5. The continuously variable transmission controller according to claim 1, wherein the drive mode includes a sport drive mode and a fuel-efficient drive mode.

6. The continuously variable transmission controller according to claim 1, wherein the shift characteristic changing means is adapted to change the target engine speed gradually so as to extend a time used to change a pulley ratio when a difference between the target engine speed and the actual engine speed is larger than the predetermined judgment value corresponding to the vehicle speed.

7. The continuously variable transmission controller according to claim 1, wherein the predetermined judgment value is read out from a prepared map corresponding to the vehicle speed.

8. The continuously variable transmission controller according to claim 1, wherein the drive mode is selected by a mode switch connected to the controller.

9. The continuously variable transmission controller according to claim 1, wherein the actuator is a slider for changing a distance between a fixed piece and a movable piece of a drive pulley of the transmission.

10. The continuously variable transmission controller according to claim 1, wherein a variation per time unit of the target engine speed is determined by the drive mode and the vehicle speed, or by the drive mode only, depending on a magnitude of the throttle opening.

11. An electronic controller for a continuously variable transmission capable of selecting plural drive modes, comprising:
    a throttle opening sensor;
    a vehicle speed sensor;
    an engine speed sensor;
    an actuator adapted to change a transmission gear ratio of the continuously variable transmission;
    a target value calculation section adapted to output a target engine speed as a function of a throttle opening and a vehicle speed; and
    a motor control value determination section adapted to determine a driving direction and a driving speed of the actuator based on a difference between the target engine speed and an actual engine speed,
    wherein the motor control value determination section includes shift characteristic changing means adapted to update a current target engine speed in a stepwise manner to change to a value for use after a change in a drive mode, in a case where it is judged that the current target engine speed is changed by an amount exceeding a predetermined judgment value according to the vehicle speed when the drive mode is selected,
    wherein an updating speed of the target engine speed differs depending on whether the drive mode change causes the target engine speed to increase or decrease.

12. The electronic controller for a continuously variable transmission according to claim 11, comprising:
    means for deciding a throttle opening judgment value set as a function of the drive mode and the vehicle speed;
    wherein the shift characteristic changing means is configured such that,
    when a current throttle opening is larger than the throttle opening judgment value, the target engine speed is updated according to the drive mode, and when a current throttle opening is smaller than the throttle opening judgment value, the target engine speed is updated according to the drive mode and the vehicle speed.

13. The electronic controller for a continuously variable transmission according to claim 11, wherein:
an updating speed of the target engine speed is made lower when the engine speed is higher according to engine speed when the drive mode is changed.

14. The electronic controller for a continuously variable transmission according to claim 11, wherein the drive mode includes a sport drive mode and a fuel-efficient drive mode.

15. The electronic controller for a continuously variable transmission according to claim 11, wherein the shift characteristic changing means is adapted to change the target engine speed gradually so as to extend a time used to change a pulley ratio when a difference between the target engine speed and the actual engine speed is larger than the predetermined judgment value corresponding to the vehicle speed.

16. The electronic controller for a continuously variable transmission according to claim 11, wherein the predetermined judgment value is read out from a prepared map corresponding to the vehicle speed.

17. The electronic controller for a continuously variable transmission according to claim 11, wherein the drive mode is selected by a mode switch connected to the controller.

18. The electronic controller for a continuously variable transmission according to claim 11, wherein the actuator is a slider for changing a distance between a fixed piece and a movable piece of a drive pulley of the transmission.

19. The electronic controller for a continuously variable transmission according to claim 11, wherein a variation per time unit of the target engine speed is determined by the drive mode and the vehicle speed, or by the drive mode only, depending on a magnitude of the throttle opening.

20. A controller for a continuously variable transmission capable of selecting plural drive modes, comprising:
means for detecting a throttle opening;
means for detecting a vehicle speed;
means for detecting an engine speed;
an actuator adapted to change a transmission gear ratio of the continuously variable transmission;
target value output means adapted to output a target engine speed as a function of the throttle opening and the vehicle speed; and
shift characteristic determination means adapted to determine a driving direction and a driving speed of the actuator based on a difference between the target engine speed and an actual engine speed,
wherein the shift characteristic determination means includes shift characteristic changing means adapted to update a current target engine speed on a stepwise basis to change to a value for use after a change in a drive mode, in a case where it is judged that the current target engine speed is changed by an amount exceeding a predetermined judgment value according to the vehicle speed when the drive mode is selected,
wherein an updating speed of the target engine speed differs depending on whether the drive mode change causes the target engine speed to increase or decrease.

21. A controller for a continuously variable transmission capable of selecting plural drive modes, comprising:
means for detecting a throttle opening;
means for detecting a vehicle speed;
means for detecting an engine speed;
an actuator adapted to change a transmission gear ratio of the continuously variable transmission;
target value output means adapted to output a target engine speed as a function of the throttle opening and the vehicle speed; and
shift characteristic determination means adapted to determine a driving direction and a driving speed of the actuator based on a difference between the target engine speed and an actual engine speed,
wherein the shift characteristic determination means includes shift characteristic changing means adapted to update a current target engine speed on a stepwise basis to change to a value for use after a change in a drive mode, in a case where it is judged that the current target engine speed is changed by an amount exceeding a predetermined judgment value according to the vehicle speed when the drive mode is selected,
wherein an updating speed of the target engine speed is made lower when the engine speed is higher according to engine speed when the drive mode is changed.

22. The continuously variable transmission controller according to claim 21, comprising:
means for deciding a throttle opening judgment value set as a function of the drive mode and the vehicle speed;
wherein the shift characteristic changing means is configured such that,
when a current throttle opening is larger than the throttle opening judgment value, the target engine speed is updated according to the drive mode, and
when a current throttle opening is smaller than the throttle opening judgment value, the target engine speed is updated according to the drive mode and the vehicle speed.

23. The continuously variable transmission controller according to claim 21, wherein an updating speed of the target engine speed differs depending on whether the drive mode change causes the target engine speed to increase or decrease.

24. The continuously variable transmission controller according to claim 21, wherein the drive mode includes a sport drive mode and a fuel-efficient drive mode.

25. The continuously variable transmission controller according to claim 21, wherein the shift characteristic changing means is adapted to change the target engine speed gradually so as to extend a time used to change a pulley ratio when a difference between the target engine speed and the actual engine speed is larger than the predetermined judgment value corresponding to the vehicle speed.

26. The continuously variable transmission controller according to claim 21, wherein the predetermined judgment value is read out from a prepared map corresponding to the vehicle speed.

27. The continuously variable transmission controller according to claim 21, wherein the drive mode is selected by a mode switch connected to the controller.

28. The continuously variable transmission controller according to claim 21, wherein the actuator is a slider for changing a distance between a fixed piece and a movable piece of a drive pulley of the transmission.

29. The continuously variable transmission controller according to claim 21, wherein a variation per time unit of the target engine speed is determined by the drive mode and the vehicle speed, or by the drive mode only, depending on a magnitude of the throttle opening.

30. An electronic controller for a continuously variable transmission capable of selecting plural drive modes, comprising:
a throttle opening sensor;
a vehicle speed sensor;
an engine speed sensor;

an actuator adapted to change a transmission gear ratio of the continuously variable transmission;

a target value calculation section adapted to output a target engine speed as a function of a throttle opening and a vehicle speed; and a motor control value determination section adapted to determine a driving direction and a driving speed of the actuator based on a difference between the target engine speed and an actual engine speed, wherein the motor control value determination section includes shift characteristic changing means adapted to update a current target engine speed in a stepwise manner to change to a value for use after a change in a drive mode, in a case where it is judged that the current target engine speed is changed by an amount exceeding a predetermined judgment value according to the vehicle speed when the drive mode is selected, wherein an updating speed of the target engine speed is made lower when the engine speed is higher according to engine speed when the drive mode is changed.

31. The electronic controller for a continuously variable transmission according to claim 30, comprising:

means for deciding a throttle opening judgment value set as a function of the drive mode and the vehicle speed;

wherein the shift characteristic changing means is configured such that, when a current throttle opening is larger than the throttle opening judgment value, the target engine speed is updated according to the drive mode, and when a current throttle opening is smaller than the throttle opening judgment value, the target engine speed is updated according to the drive mode and the vehicle speed.

32. The electronic controller for a continuously variable transmission according to claim 30, wherein an updating speed of the target engine speed differs depending on whether the drive mode change causes the target engine speed to increase or decrease.

33. The electronic controller for a continuously variable transmission according to claim 30, wherein the drive mode includes a sport drive mode and a fuel-efficient drive mode.

34. The electronic controller for a continuously variable transmission according to claim 30, wherein the shift characteristic changing means is adapted to change the target engine speed gradually so as to extend a time used to change a pulley ratio when a difference between the target engine speed and the actual engine speed is larger than the predetermined judgment value corresponding to the vehicle speed.

35. The electronic controller for a continuously variable transmission according to claim 30, wherein the predetermined judgment value is read out from a prepared map corresponding to the vehicle speed.

36. The electronic controller for a continuously variable transmission according to claim 30, wherein the drive mode is selected by a mode switch connected to the controller.

37. The electronic controller for a continuously variable transmission according to claim 30, wherein the actuator is a slider for changing a distance between a fixed piece and a movable piece of a drive pulley of the transmission.

38. The electronic controller for a continuously variable transmission according to claim 30, wherein a variation per time unit of the target engine speed is determined by the drive mode and the vehicle speed, or by the drive mode only, depending on a magnitude of the throttle opening.

* * * * *